Patented Sept. 21, 1937

2,093,511

UNITED STATES PATENT OFFICE 2,093,511

AZO DYESTUFFS

José Stephen Petrus-Blumberger, Delft, Netherlands, assignor to General Aniline Works, Inc., New York, N. Y., a corporation of Delaware No Drawing. Application April 22, 1936, Serial No. 75,885. In Germany May 2, 1935

4 Claims. (Cl. 260—76)

The present invention relates to new azo dyestuffs, more particularly it relates to azo dyestuffs which may be represented by the following formula

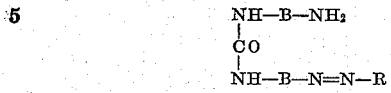

wherein B stands for a radical of the benzene series bearing the NH group and the amino group or azo group respectively in meta position to each other, for example for phenyl or alkyl-, halogen- or carboxy- substituted phenyl, and R stands for the radical of 1-amino-5-naphthol-7-sulfonic acid, 2-amino-8-naphthol-6-sulfonic acid or of a peri aminonaphthol sulfonic acid, such as 1-amino-8-naphthol-3,6-disulfonic acid, the said aminonaphthol sulfonic acids being coupled to the naphthol side and may bear coupled to the amino side an azo group.

My new dyestuffs are obtainable by monodiazotizing 3,3'-diaminodiphenyl urea or a homologue thereof and coupling the same on the hydroxyl side with 1-amino-5-naphthol-7-sulfonic acid or 2-amino-8-naphthol-6-sulfonic acid or a peri aminonaphthol sulfonic acid, such as 1-amino-8-naphthol-3,6-disulfonic acid, the aminonapthol sulfonic acid being if desired already coupled to the amino side. Generally coupling is effected in an alkaline medium. Using peri aminonaphthol sulfonic acid coupling may be also effected in an acetic acid medium, whereby, besides coupling on the hydroxyl side, likewise coupling on the amino side may be effected.

My new dyestuffs are of particular technical interest because, when diazotized or tetrazotized on the fibre and developed, for instance with β-naphthol or m-toluylenediamine, generally varying shades of good fastness to washing are obtained, which discharge well both with a neutral and also with an alkaline discharging agent.

The invention is illustrated by the following examples, but is not restricted thereto:

Example 1

242 parts by weight of 3,3'-diaminodiphenyl urea are diazotized with 69 parts by weight of nitrite and 300 parts by weight of concentrated hydrochloric acid at a temperature as low as possible. The finished diazo solution is poured into a solution alkaline with sodium carbonate of 239 parts by weight of 2-amino-8-naphthol-6-sulfonic acid. After coupling is complete, the dyestuff is filtered off, squeezed and dried. The dyestuff dyes cotton corinth shades. After diazotizing and developing with m-toluylenediamine, a violetish brown of good fastness to washing is obtained, which discharges well both with a neutral and also with an alkaline discharging agent.

In its free state the dyestuff corresponds to the following formula:

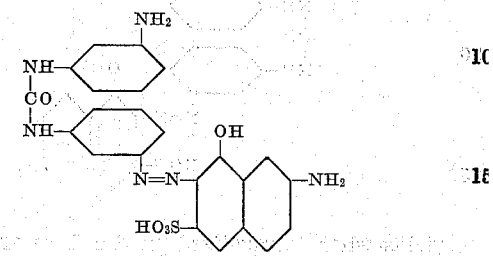

Example 2

242 parts by weight of 3,3'-diaminodiphenyl urea are diazotized in the manner indicated in Example 1, and the finished diazo solution is then added to a solution alkaline with sodium carbonate of the dyestuff from diazotized p-nitraniline and 1-amino-8-naphthol-3,6-disulfonic acid (acid coupled) reduced with the aid of sodium sulfide. The dyestuff solution is heated to 60° C. and the dyestuff salted out. After squeezing and drying a dyestuff is obtained that dyes cotton green shades and, after diazotizing and developing with acetoacetic ethyl ester, dyes a full green of good fastness to washing which discharges well both with a neutral and with an alkaline discharging agent.

In its free state the dyestuff corresponds to the following formula:

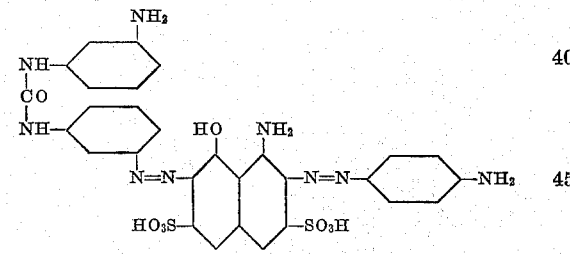

Example 3

242 parts by weight of 3,3'-diaminodiphenyl urea are diazotized in the manner indicated in Example 1 and then the diazo solution is poured into a solution of 341 parts by weight of 1-amino-8-naphthol-3,6-disulfonic acid, 300 parts by weight of an aqueous solution of caustic soda of 36° Bé. and 250 parts by weight of acetic acid of 80% strength. Coupling is complete at once. The dyestuff is separated in the usual manner. It dyes the fibre corinth shades, which, after diazotizing and developing with m-toluylenediamine, change to a deep brown of good fastness to washing, which discharges well both with a neutral and also with an alkaline discharging agent.

In its free state the dyestuff corresponds to the following formula:

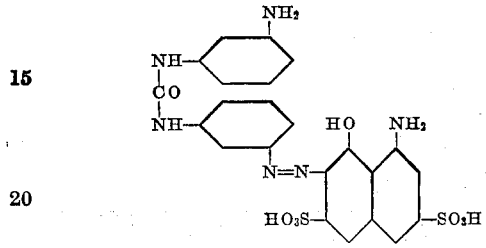

The dyestuff prepared in an analogous manner and having in the free state the following formula:

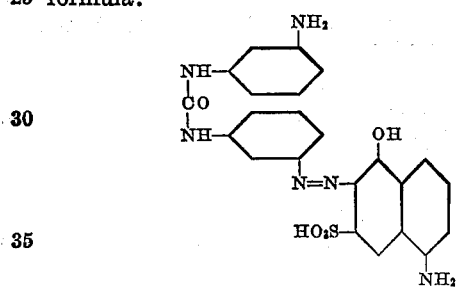

yields when tetrazotized on the fibre and developed with m-toluylenediamine a brown of good dischargeability.

I claim:

1. Azo dyestuffs of the general formula:

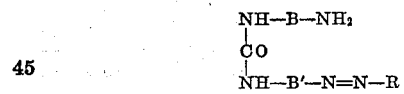

wherein B stands for a radical of the benzene series bearing the NH group and the amino group in meta position to each other, B' stands for a radical of the benzene series bearing the NH group and the azo group in meta-position to each other, and R stands for an aminonaphthol sulfonic acid selected from the group consisting of 1-amino-5-naphthol-7-sulfonic acid, 2-amino-8-naphthol-6-sulfonic acid, peri aminonaphthol sulfonic acids and such derivatives thereof having coupled to the amino side a diazo compound, the said aminonaphthol sulfonic acids being coupled to the naphthol side, yielding when diazotized or tetrazotized on the fibre and developed, varying shades of good fastness to washing and good dischargeability.

2. The dyestuff having in its free state the following formula:

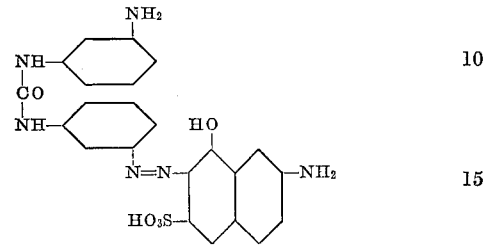

yielding when tetrazotized on the fibre and developed with m-toluylenediamine a violetish brown of good fastness to washing and good dischargeability.

3. The dyestuff having in its free state the following formula:

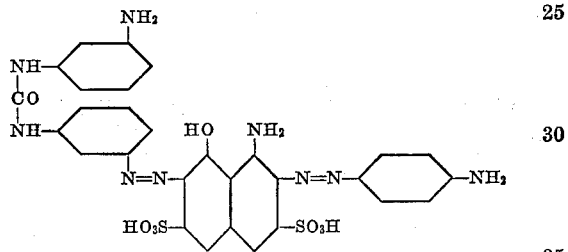

yielding when diazotized on the fibre and developed with acetoacetic ethyl ester a full green of good fastness to washing and good dischargeability.

4. The dyestuff having in its free state the following formula:

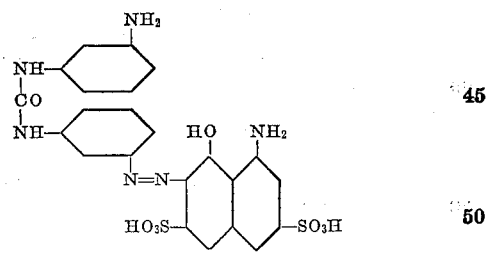

yielding when diazotized on the fibre and developed with m-toluylenediamine a deep brown of good fastness to washing and good dischargeability.

JOSÉ STEPHEN PETRUS-BLUMBERGER.